June 19, 1923.

A. CROSSLEY 1,459,047

GROUNDING BOX FOR ELECTRICAL PILOTING CABLES

Filed Feb. 5, 1921

Inventor
Alfred Crossley

By E. M. Clapton
Attorney

Patented June 19, 1923.

1,459,047

UNITED STATES PATENT OFFICE.

ALFRED CROSSLEY, OF WASHINGTON, DISTRICT OF COLUMBIA.

GROUNDING BOX FOR ELECTRICAL PILOTING CABLES.

Application filed February 5, 1921. Serial No. 442,849.

*To all whom it may concern:*

Be it known that I, ALFRED CROSSLEY, a citizen of the United States, residing at Washington, in the District of Columbia, have invented new and useful Improvements in Grounding Boxes for Electrical Piloting Cables, of which the following is a full, clear, and exact description thereof.

My invention relates to improvements in grounding boxes for electrical piloting cables and has for its principal object the provision of a means of this character permitting electrical connection between the box and armor of the cable.

Another object thereof is to provide a means of this character which will prevent the conductor from being exposed to the corrosive action of salt water adjacent the point where the conductor is grounded.

A further object of my invention is to reduce the resistance offered to the return of the current through water, earth, and cable thereby effecting a saving in power.

My invention is applicable to those systems of electrical piloting in which the end of the conductor is grounded, the return path for the current being partly through water and earth and partly through the armor of the cable. Such systems are well known, and as my invention relates only to the means for connecting the cable to the grounding box so that electrical connection is made between the box and cable armor it is thought to be unnecessary to illustrate and describe the system as a whole. For a detailed description of an electrical piloting system reference is made to my prior application filed July 27, 1920, Serial No. 399,406.

I will now describe in detail the preferred form of my grounding box, reference being had to the acompanying drawings in which.

Figure 1:
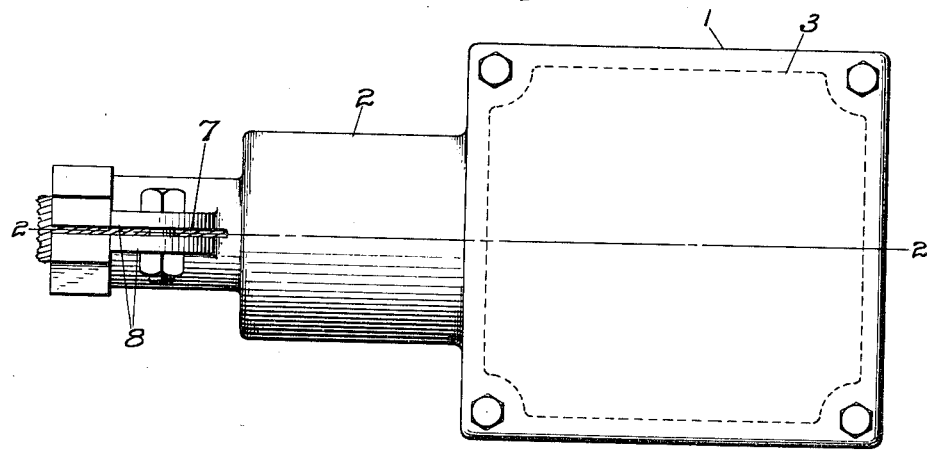
Fig. 1 is a plan view of the box.

Numeral 1 indicates the grounding box having a neck 2 and provided with a removable cover plate 3.

The neck of the grounding box is screw threaded, as shown at 4 and is provided with an annular flange or shoulder 5.

A plug 6 adapted to be screwed into the neck is split as shown at 7 and has clamps 8, 8, thereon, whereby the plug may be clamped onto the cable after it has been passed there through and secured in the manner to be described.

Within the neck of the box is located an armor cone 9 with its base adjacent the shoulder 5, and also a ring wedge 10 with its base adjacent the face of plug 6.

Figure 2:
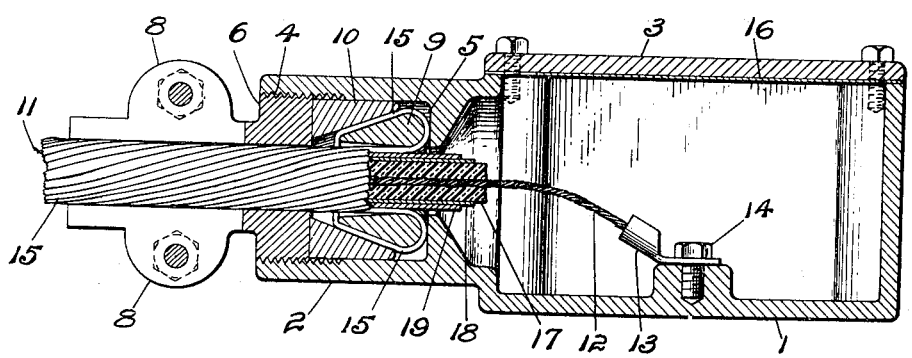
Fig. 2 is a vertical sectional view taken on the line 2—2 of Fig. 1, a portion of the cable being in section to disclose the construction thereof.

In the operation of securing the cable 11 to the box it is lead through the opening in the clamping plug, wedge ring and armor cone, after which the cable end enters into the interior of the grounding box proper. Before positioning the cable in the box a short length of the armor 15 is unwound and turned back over the armor cone 9 as clearly illustrated in Fig. 2. The cable is then moved inward until the armor surrounding the cone abuts against the shoulder 5. The ring wedge 10 is now brought up into position and the plug screwed into place thereby producing a wedging action to secure the armor and cable. By means of clamps 8, 8, the plug is now clamped down on the cable.

The conductor 12 of the cable may be directly connected with one of the walls of the box in any usual manner as by means of a lug 13 and screw 14.

The box is preferably filled with some insulating water proof material. The box cover is then secured in place, a gasket 16 being employed to render the box water tight.

The particular cable constitutes no part of the present invention, but the preferred type is illustrated. A layer of rubber 17 surrounds the conductor 12, the rubber being wrapped with tape as indicated by numeral 18. Around the tape is a layer of jute 19 impregnated with a waterproof insulating compound, and surrounding the jute is the armor 15.

It will be clear from the foregoing description that I have produced a grounding box which not only offers small resistance to the return path of the current, but also protects the conductor from the corrosive action of salt water.

Having fully described my invention, what I claim as new and desire to secure by Letters Patent is:

A protective grounding means for armored electrical piloting cables comprising a water-tight box of electrical conducting material fixedly secured and electrically connected to the armor of said cable at its sea end, and means for electrically connecting the conductor of said cable to the interior of said box.

ALFRED CROSSLEY.